Oct. 19, 1926.

M. ALDEN 1,603,262

MANUFACTURE OF HOLLOW ARTICLES

Filed March 6, 1926

Inventor:
Milton Alden.
by Charles N. Gooding
atty.

Patented Oct. 19, 1926.

1,603,262

UNITED STATES PATENT OFFICE.

MILTON ALDEN, OF SPRINGFIELD, MASSACHUSETTS.

MANUFACTURE OF HOLLOW ARTICLES.

Application filed March 6, 1926. Serial No. 92,916.

This invention relates to an improved core to be used in the manufacture of hollow articles and more particularly to be used in the art of molding hollow articles from plastic material such, for example, as certain of the various synthetic compounds of phenol and aldehydes.

The core of this invention is an improvement upon the core disclosed in United States Letters Patent No. 1,554,697, issued to me on September 22, 1925 and entitled "Manufacture of hollow articles", but differs therefrom in that it is cast, while the core of said patent is formed by pressure.

The core of this invention embodies the following characteristics:—

1st. The core is soluble in water.

2nd. The core dissolves in hot water more readily than in cold.

3rd. The melting temperature of the core is above the melting temperature of the material which is to be molded around it.

4th. The core is made of such material that it may be cast while the material is in a fused condition.

5th. The core after being cast has sufficient strength to withstand the molding pressure of the article which is being molded thereon.

6th. The core is made of material that will have very slight shrinkage when cooling from a fused to a solid state.

A core for the purpose for which the core of this invention is intended should be capable of dissolving readily in water, should be hard, strong, cheap, and its melting point should be above 375° Fahrenheit or 190° centigrade, and should have as little contraction as possible when passing from a liquid to a solid state.

The core of this invention is intended to be used in the molding or shaping of temporarily plastic or other material about it, the core being subsequently dissolved in water to enable it to be readily detached from the surrounding article which has been molded thereon.

From a commercial point of view, the core of this invention is adapted to be used in molding articles from synthetic compounds such as, phenol and aldehyde, and particularly from those compounds known commercially as phenolic condensation products. In molding said hollow articles it is desirable that the core used in the molding process shall have a higher melting point than the melting point of the article which is being molded, and also, that it shall have a coefficient of cubical expansion approximately equal to that of said material.

The necessity that the core shall have a higher melting point than that of the article being molded, arises from the fact that in the molding process, the mold and the core and the material are all heated, and in order to preserve the interior shape of the finished article, which is given to it by the core, it is necessary that the core should not melt or soften appreciably during the molding process, that is, while heat is being applied to the material which is being molded, in order to render it plastic.

The core of this invention differs from the core of my invention embodied in said Letters Patent in that it is composed of materials which can be cast while in a fused state and which will not contract to any material extent when the core is cooling prior to being inserted in a mold. The core of my invention embodied in said Letters Patent was composed of sodium chloride or common table salt and was formed by pressure, but the melting point of table salt is too great to form a core by casting, as the shape of the core would change too much from the shape of the mold in which it is cast, if the core is made of sodium chloride.

I have found that the most satisfactory materials for forming a cast core embodying the characteristics hereinbefore set forth, are sodium nitrate, potassium nitrate, cryolite and sodium chloride, approximately in the following proportions:—40% sodium nitrate; 20% potassium nitrate; 35% cryolite, and 5% sodium chloride. In forming the core, the sodium nitrate and the potassium nitrate are melted together in an iron pot and when completely fused, but not overheated, sodium chloride is added and the cryolite is slowly poured into the mixture, while the same is being constantly stirred until the material is quiescent. After having been heated for about fifteen minutes it is ready to be poured into a mold of the shape desired for the completed core.

Cryolite is a natural fluoride of sodium and aluminum $3NaF.AlF_3$, and is generally obtained from Colorado or Greenland.

Hollow articles formed of the material set forth and by the employment of my improved core are suitable for elbow and pipe fittings for chemical pipes, toilet seats, mercury flasks, bowling balls, flat-iron handles and many other articles of similar character, and any large articles which it would be impracticable to cast solid on account of the high cost of the material of which they are formed or the length of time necessary to cure them, when in a solid mass.

The invention will now be explained in connection with the accompanying drawings.

Figure 1:
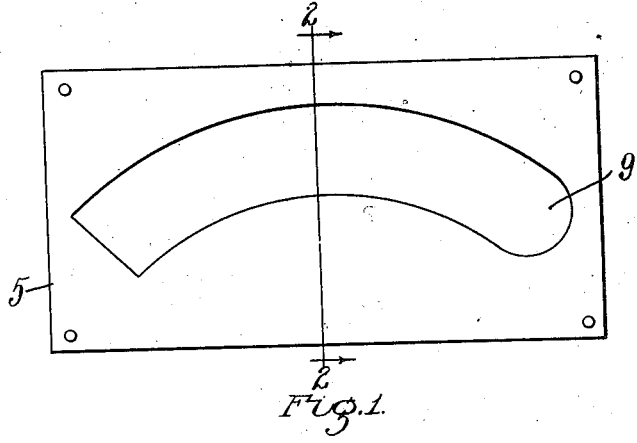
Figure 1 is a plan view of the body portion of a mold for casting the core.
Figure 2:
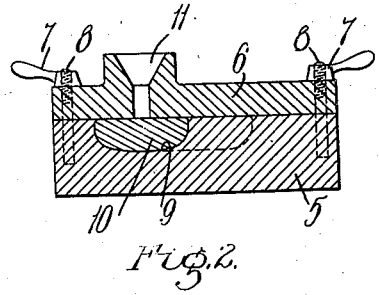
Fig. 2 is a section taken on line 2—2 of Fig. 1 with the cover of the mold attached to the body portion thereof and illustrating a core in the mold.
Figure 3:
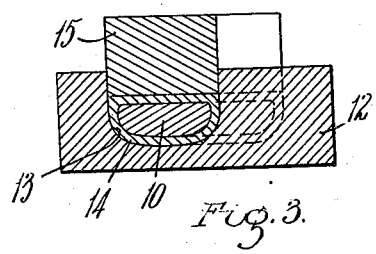
Fig. 3 is a section of a mold and plunger with a core positioned in the mold and the material molded about said core.

In the drawings, Figs. 1 and 2, 5 is the body portion of a mold, and 6 the cover which is attached to the body portion of the mold by means of clamps 7 which have screw-threaded engagement with bolts 8 which project through the cover 6 and are fastened to the body portion 5. The body portion 5 is provided with a recess 9 of the shape of a core 10 which is to be cast, and which is to be utilized in the molding of one portion of a two part toilet seat 14. The material of which the core 10 is to be cast is poured through an opening 11 in the cover, while said material is in a fused state. After the core has cooled, the cover 6 is removed and the core is positioned in a usual manner in a mold 12, Fig. 3. The material of which the toilet seat is to be constructed, in this particular case a phenolic condensation product, or any other suitable molding material, is forced into the cavity 13 between the mold 12 and the core 10 by a plunger 15 as illustrated in Fig. 3.

The material for the toilet seat 14 when thus forced into the cavity 13 is subjected simultaneously to high pressure and high temperature, preferably in a steam heated hydraulic press. The material in the mold cavity 13 first softens and becomes plastic under the effect of the heat, and then flows freely under the influence of the pressure throughout the interior of the mold 5 and around the core 10. The continued application of heat causes the material to harden and set into a solid mass which will not again be rendered plastic by further heat.

Figure 4:
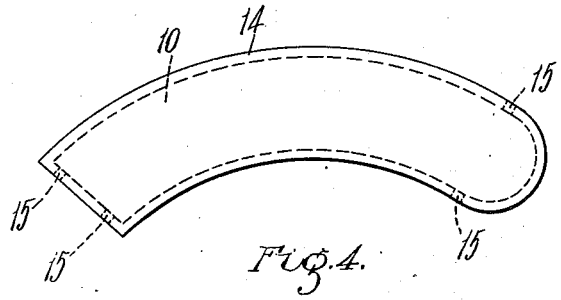
Fig. 4 is a plan view of one portion of a two-part toilet seat molded in accordance with this invention.

The molding operation has now been completed and after the molded article 14 has cooled sufficiently, it is taken from the mold 12 and forms the portion of a toilet seat 14 illustrated in Fig. 4. The next step in the process is the removal of the core from the interior of the article and this is accomplished by drilling holes 15 at suitable points in the article and then the article is placed in water which dissolves the core 10 and the dissolved material will be carried out of the article 14 with the water.

By the use of the cast core 10 and mold 12 above described, the inner and outer faces of the molded article, as well as the edges of any openings that may extend through the walls thereof will be smooth so that no subsequent machining operations will be required. This is an important feature, inasmuch as smoothness of the molded faces and edges is usually highly desirable. This is particularly true in the case of molded articles of bakelite, condensite or the like, which are to be used as insulators or casings for electrical apparatus, or as in the present case, for toilet seats.

It is to be understood that the invention is not limited to the employment of cores formed of the particular materials and in the particular proportions hereinbefore set forth, inasmuch as various other materials may be found equally well suited for the purpose, it is desirable, however, that the material used be soluble in water and that it may be cast, and that the melting point of the material composing the core be higher than the molding temperature, and that the material of which the core is made shall have a very slight shrinkage when cooling from a fused to a solid state.

While it is preferable in the manufacture of my improved molding core to embody therein cryolite and sodium chloride, still either one, or both of these materials may be omitted and a practical article of manufacture obtained, and I, therefore, do not wish to be limited to the use of either one or both of these articles in the cast molding core of my invention.

In the event that both cryolite and sodium chloride are omitted, the proportions of sodium nitrate and potassium nitrate would remain the same as hereinbefore set forth, that is, there would be approximately 67% of sodium nitrate and 33% potassium nitrate, and if cryolite were to be omitted and sodium chloride used, or if the sodium chloride were to be omitted and cryolite used, the proportions of the sodium nitrate and potassium nitrate would still be the same, that is, twice as much sodium nitrate would be used as potassium nitrate.

I claim:—

1. As an article of manufacture a cast molding core soluble in water.

2. As an article of manufacture a cast molding core, said core being soluble in water and capable of being further compressed and contracted by the force of the shrinking material which is being molded thereon.

3. As an article of manufacture a cast core for molding temporarily plastic material, consisting of material soluble in water and having a melting point greater than that of said temporarily plastic material.

4. As an article of manufacture a cast core for molding temporarily plastic material, consisting of material soluble in water and having a coefficient of cubical expansion approximately equal to that of said temporarily plastic material.

5. As an article of manufacture a cast molding core soluble in water and having a small coefficient of expansion.

6. As an article of manufacture a molding core which comprises sodium nitrate, potassium nitrate, cryolite and sodium chloride.

7. As an article of manufacture a molding core which comprises 40% sodium nitrate, 20% potassium nitrate, 35% cryolite and 5% sodium chloride.

8. The herein described process of forming a molding core which comprises melting sodium nitrate and potassium nitrate together and when completely fused but not overheated adding sodium chloride and cryolite slowly while constantly stirring, and when quiescent, after heating, pouring the fluid mixture into a mold.

9. The herein described process of forming a molding core which comprises melting 40% of sodium nitrate and 20% of potassium nitrate together and when completely fused but not overheated, adding thereto 5% sodium chloride and 35% cryolite, pouring the cryolite slowly into the mixture while constantly stirring, and when quiescent, and after heating for approximately fifteen minutes, pouring the mixture into a mold.

10. As an article of manufacture a molding core which comprises sodium nitrate and potassium nitrate.

11. As an article of manufacture a molding core which comprises sodium nitrate, potassium nitrate and cryolite.

12. As an article of manufacture a molding core which comprises sodium nitrate, potassium nitrate and sodium chloride.

In testimony whereof I have hereunto set my hand.

MILTON ALDEN.